United States Patent
Gutman et al.

[19]

[11] Patent Number: 6,014,423

[45] Date of Patent: Jan. 11, 2000

[54] MULTIPLE CORNER KIRKPATRICK-BAEZ BEAM CONDITIONING OPTIC ASSEMBLY

[75] Inventors: George Gutman, Birmingham; Licai Jiang; Boris Verman, both of Troy, all of Mich.

[73] Assignee: OSMIC, Inc., Troy, Mich.

[21] Appl. No.: 09/026,391

[22] Filed: Feb. 19, 1998

[51] Int. Cl.⁷ .................................................. G21K 1/06
[52] U.S. Cl. .................. 378/85; 378/84; 378/156
[58] Field of Search ................. 378/84, 85, 147, 378/156, 160

[56] References Cited

U.S. PATENT DOCUMENTS

| | | |
|---|---|---|
| 4,242,588 | 12/1980 | Silk et al. . |
| 4,525,853 | 7/1985 | Keem et al. . |
| 4,951,304 | 8/1990 | Piestrup et al. ................ 378/119 |
| 4,958,363 | 9/1990 | Nelson et al. . |
| 5,027,377 | 6/1991 | Thoe . |
| 5,138,158 | 8/1992 | Ninomiya et al. ................ 250/302 |
| 5,604,782 | 2/1997 | Cash, Jr. . |

FOREIGN PATENT DOCUMENTS

WO 96/04665    2/1996    WIPO .

OTHER PUBLICATIONS

XP–002104740–X–Ray Microscope With Multilayer Mirrors–J. Underwood; T. Barbee & C. Frieber–Applied Optics–Vol. 25, No. 11–6/1/86.

XP–002104741–Medium–Sized Grazing Incidence High–Energy X–Ray Telescopes Employing Continuously Graded Multilayers–K. Joensen; C. Schnopper;G. Gorenstein; J. Susini; J. Wood; K. Parker–SPIE Vol. 1736 X–Ray Detector Physics and Applications(1992)–239.

XP–002104742–GeoCARS Microfocusing Kirkpatrick–Baez Mirror Bender Development–M. Rivers; W. Schildkamp; P. Eng–1995 American Institute of Physics.

Improved Prompt Gamma Neutron Activation Analysis Facility Using a Focused Diffracted Neutron Beam–1998 Elsvier Science B.V.

*Primary Examiner*—Donald Hajec
*Assistant Examiner*—Michael J. Schwartz
*Attorney, Agent, or Firm*—Harness, Dickey & Pierce PLC

[57] ABSTRACT

An x-ray reflecting system comprising a plurality of x-ray reflectors, wherein the x-ray reflectors are coupled together to form a Kirkpatrick-Baez side-by-side system of multiple corners and may include multi-layer or graded-d multi-layer Bragg x-ray reflective surfaces.

16 Claims, 2 Drawing Sheets

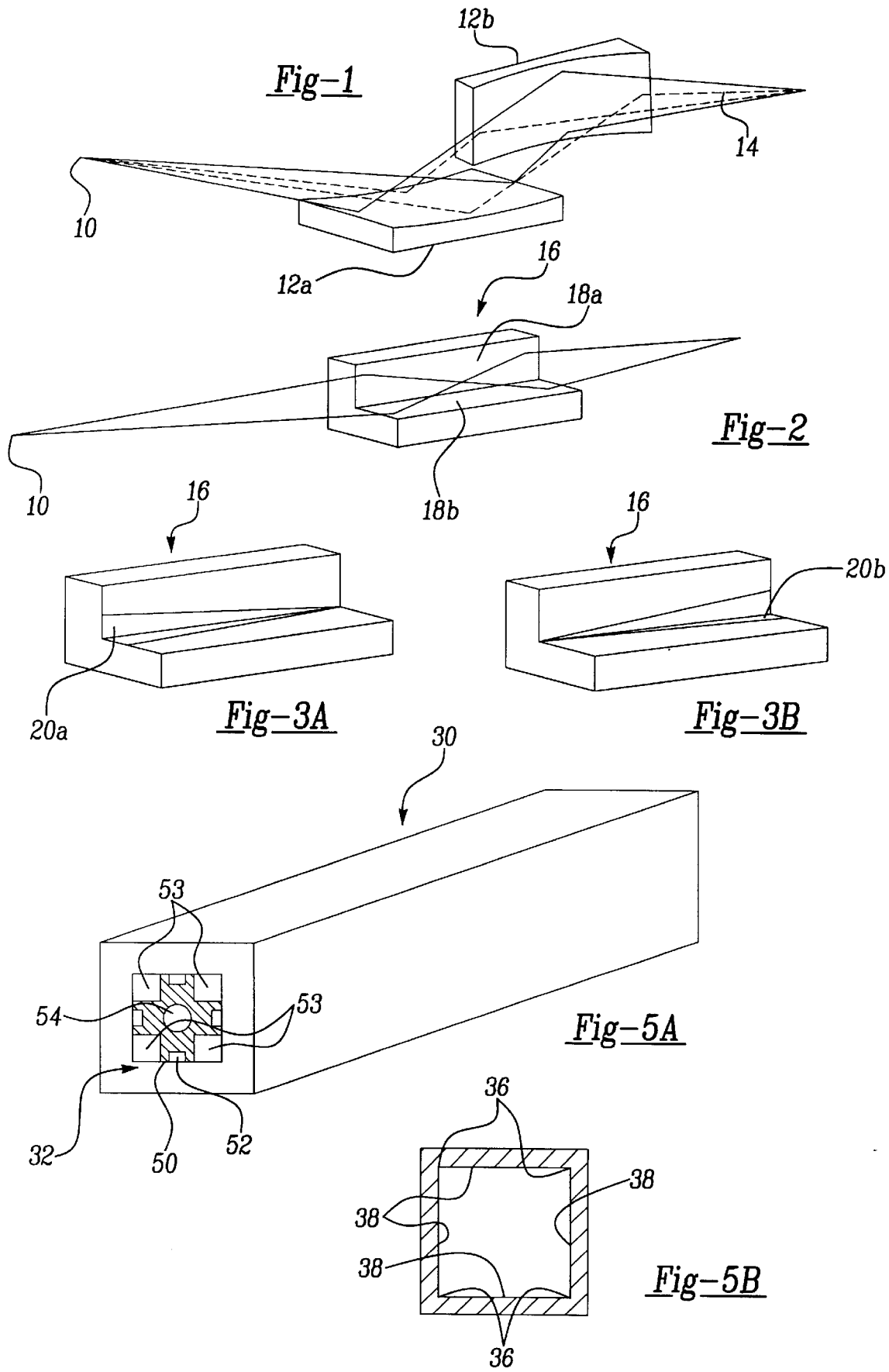

MULTIPLE CORNER KIRKPATRICK-BAEZ BEAM CONDITIONING OPTIC ASSEMBLY

BACKGROUND OF THE INVENTION

The present invention relates to an x-ray optic. More specifically the present invention relates to an improved Kirkpatrick-Baez optical apparatus to condition, direct, focus, or collimate an x-ray beam.

There are various applications which utilize conditioned, directed, collimated, or focused x-rays. For example, medical radiotherapy systems utilize x-rays to destroy malignant tissue, x-ray diffraction or microdiffraction analysis systems channel x-ray radiation at a sample crystal to generate a diffraction pattern corresponding to its lattice structure, and x-ray fluorescence and spectroscopy systems employ directed x-ray beams.

In many applications it is desirable to direct a beam in two dimensions. To collimate a beam in two dimensions, the traditional Kirkpatrick-Baez optical scheme may be employed. Two crossed mirrors arranged in sequential order collimate a divergent x-ray beam along two directions independently. With a point source, this sequential order system equipped with two parabolic mirrors will provide a parallel beam. With a finite source this system will provide a beam with different divergences in two directions. This sequential order system equipped with two elliptical mirrors can give a perfect real point image with a point source at its focal point. For a field object, the image will be magnified or demagnified by the system. Since the two mirrors are different distances from the object, the magnification will be different for both directions.

The present invention employs an innovative variation of the Kirkpatrick-Baez system employing a side-by-side scheme. The side-by-side system provides a solution to the problems associated with a sequential system as well as providing other advantages. The mirrors in a side-by-side system can be arranged at the most appropriate location for optimized optical performance to increase flux, shortening the time needed for data collection by an x-ray detection device. The side-by-side system will suffer less from surface imperfections and is prealigned and bonded to prevent alignment errors. The side-by-side optic is also much more compact than that of a sequential scheme enabling it to be used in applications where space is at a premium. The performance of a side by side optic can be even further improved by incorporating multi-layer Bragg x-ray reflectors. The multi-layer reflectors have a large reflection angle resulting in higher collection efficiency and provide the ability to select the frequencies of reflected x-rays.

SUMMARY OF THE INVENTION

The present invention is a new type of x-ray optic based upon the Kirkpatrick-Baez side-by-side scheme. The present invention also incorporates multi-layer Bragg reflectors that are prealigned and bonded together in the Kirkpatrick-Baez scheme. The reflectors will provide a large flux density when focused on a small sample and the multi-layer structure will allow the x-ray optic to control the frequency band reflected. The x-ray optic will have the ability to reflect x-rays in a broad band, narrow band, monochromatic, or frequency selectable polychromatic manner.

An object of the present invention is to increase the flux on a sample.

Another object of the invention is to decrease aberration of an x-ray optic.

Another object of the invention is to create a compact x-ray optic that is easily maneuverable.

A further object of the invention is to provide an x-ray optic that is easily aligned.

An even further object of the invention is to provide a narrow frequency band, monochromatic, or frequency selectable polychromatic x-ray beam.

BRIEF DESCRIPTION OF THE DRAWINGS

FIG. 1 is a diagrammatic view of a traditional sequentially ordered Kirkpatrick-Baez mirror system;

FIG. 2 is a diagrammatic view of a side-by-side Kirkpatrick-Baez mirror system;

FIGS. 3a–3b are diagrammatic views of a side-by-side Kirkpatrick-Baez mirror system illustrating the system's working areas;

FIG. 5a is a perspective view of the second embodiment of the present invention; and FIG. 5b is a cross-section of the second embodiment of the present invention.

DETAILED DESCRIPTION OF THE PREFERRED EMBODIMENT

Figure 4:
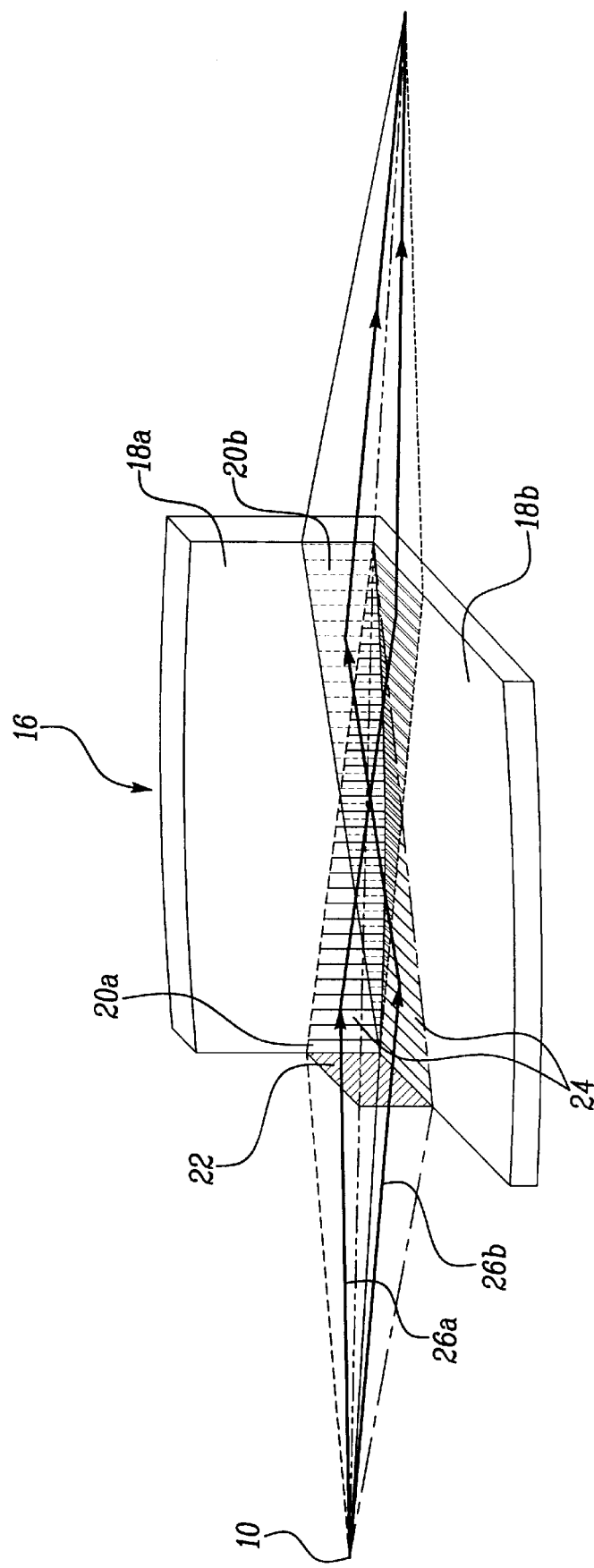
FIG. 4 is a more detailed diagrammatic view of a side-by-side Kirkpatrick-Baez system illustrating x-ray beam paths.

FIG. 1 is a diagrammatic view of a traditional sequentially ordered Kirkpatrick-Baez mirror system. This sequentially ordered mirror system may focus or collimate an x-ray beam in two dimensions by reflecting a divergent x-ray beam along two directions independently. The mirrors 12a and 12b are arranged in consecutive order and may be configured with a parabolic or elliptical surface. With a point source 10, this sequential order system equipped with two parabolic mirrors will provide a parallel beam. With a finite source, this parabolic mirror system will provide a focused beam with different divergences in two direction. When elliptical mirrors are substituted for parabolic mirrors the sequentially ordered system will give a perfect real point image with a point source at its focal point. For a field object, the image will be magnified or demagnified by the system. The magnification will vary with the distances separating the mirrors and the object.

There are several limitations which greatly affect the performance of the sequential order Kirkpatrick-Baez system. There is no way to install both mirrors at the most optimized positions, which results in less flux and a larger aberration. Consider a figure deviation from the ideal curvature $\Delta\alpha$ of the reflective surface, the deviation of the ray from the theoretical position at the image plane will be equal to $2\Delta\alpha l$, where l is the distance between incident point and image plane. For a sequential system, the figure error on the mirror nearer to the object results in a larger deviation. When the mirrors are located at different distances from the detector, if both mirrors have the same angular deviation, the aberration from the mirror closest to the source will be larger. A sequential order Kirkpatrick-Baez system will have varied amplification because the mirrors are placed at different positions with relation to field object distance. Lastly, the alignment hardware for a sequential order Kirkpatrick-Baez mirror is bulky and complicated and the alignment procedures are difficult and time consuming since the adjustments include alignments relative to the beam and the alignments relative to both mirrors.

A side-by-side Kirkpatrick-Baez system provides a solution to the problems associated with a sequential system as well as providing other advantages. In FIG. 2 a side-by-side system is shown generally as 16. The reflecting surfaces 18a and 18b are mounted adjacent at a 90 degree angle. The side-by-side system has no distance offset between reflecting surfaces as does the sequential order system, reducing potential aberration problems.

FIGS. 3a–3b are diagrammatic views of a side-by-side Kirkpatrick-Baez mirror system illustrating a first working zone 20a and second working zone 20b upon the mirror surfaces. The working zones 20a and 20b are located upon and adjacent to the corner formed by the coupling of the reflective surfaces 18a and 18b.

FIG. 4 is a more detailed diagrammatic view of a side-by-side Kirkpatrick-Baez system illustrating incident and reflected x-ray beam paths. Individual x-ray beams 26a and 26b are radiated from x-ray source 10 and may first be examined at the cross section 22 of the x-ray beam. The cross section 22 of the beam illustrates the many divergent directions of the x-ray beams exiting the x-ray source 10. Individual x-ray beam 26a is incident upon working zone 20a which lies generally upon the junction of reflective surfaces 18a and 18b. Individual x-ray beam 26b is also incident upon working zone 20a. The beams 26a and 26b are reflected by working zone 20a and redirected to working zone 20b which also lies generally upon the junction of reflective surfaces 18a and 18b opposite and partially overlapping working zone 20a as shown in FIG. 3a and 3b. The beams 26a and 26b then exit the system 16 and may be in divergent, collimated or focused form depending upon the shapes of the reflective surfaces 18a and 18b and the form of the x-ray source. This configuration is generally known as an single corner configuration.

Any combination of parabolic or elliptical mirror surfaces for the present invention may be used. For example, one reflecting surface may have an elliptical surface and a second reflecting surface may have a parabolic reflecting surface.

The reflective surfaces in the preferred embodiment are configured as multi-layer or graded-d multi-layer Bragg mirrors although total reflection mirrors, crystal or other x-ray reflective structures may be used. Bragg structures only reflect x-ray radiation when Bragg's equation is satisfied:

$$n\lambda = 2d\sin(\theta)$$

where n=the order of reflection

λ=wavelength of the incident radiation d=layer-set spacing of a Bragg structure or the lattice spacing of a crystal θ=angle of incidence Multi-layer or graded-d multi-layered Bragg mirrors are optics with a fixed focal point which utilize their inherent Bragg structure to reflect monochromatic x-ray radiation. The bandwidth of the reflected x-ray radiation can be customized by manipulating the optical and multi-layer parameters. The d-spacing of the multi-layer mirror can be tailored in such a way that the Bragg condition is satisfied at every point on the multi-layer mirror. The d spacing may be changed laterally or depthwise to control the bandpass of the multi-layer mirror.

The multi-layer mirror has a large reflection angle resulting in higher collection efficiencies for incident x-rays. These multi-layered mirrors could increase the flux by more than an order with a fine focus x-ray tube, as compared with total reflection mirrors. Multi-layered mirrors, because of their monochromatic output, could also reduce the unwanted characteristic radiation emitted from a sample during diffraction analysis by thousands of times.

FIGS. 5a and 5b are illustrations of a four corner Kirkpatrick-Baez optic shown generally as 30. Two side-by-side Kirkpatrick-Baez systems have been prealigned and coupled together to form an x-ray reflector having four corners 36 and an entrance zone 32 and exit zone (not shown). Although a four corner optic 30 is shown in FIGS. 5a and 5b any multiple corner configuration is within the present invention as any number of side-by-side system may be configured together. As multiple corners are added the present invention will assume a starlike or multifaceted configuration. Each corner may be configured for individual focal points and resolutions.

The four corner optic 30 has a symmetric or cylindrical configuration defined as any three dimensional object having a substantially enclosed inner surface with entrance and exit zones. The four corner system 30 is similar to the side-by-side single corner system in that it utilizes the surfaces adjoining the corners 36 of the coupled reflector surfaces to redirect x-rays. The advantage of this four corner x-ray optic 30 is that there are more reflection zones because of the additional corners 36, increasing the flux density of the reflected beam as it exits the four corner x-ray optic 30. The segments 38 of the reflector surfaces lying between the corners will also direct x-rays in the desired manner, as shown in FIG. 5b. As in the single corner configuration, the mirrors may be configured with parabolic surfaces, elliptical surfaces, or any combination of parabolic or elliptical surfaces but are not limited to such.

A four corner system 30 employing elliptical mirrors may focus the reflected beam on a sample element or x-ray detector. The resolution and angular range of the measurement therefore can be improved simultaneously. The flux density is increased under a focusing scheme which in turn results in better contrast. As discussed previously each individual corner of a multiple cornered optic may be configured with different focal lengths.

The performance of the four corner Kirkpatrick-Baez optic 30 may be significantly increased by utilizing multi-layer or graded-d multi-layer Bragg mirrors as the x-ray reflection surface. As discussed previously, the flux output of a multi-layer could be greater than five times that of other x-ray reflection technology and has the ability to reflected selected frequency bands of x-rays. The output of the four corner optic 30 may then be configured to be a narrow frequency band, monochomatic, or frequency selectable polychromatic output. The d-spacing and curvature could be configured to reflect different wavelengths for different corners or segments.

This type of optic 30, when used as beam conditioning optic, can deliver photons at different energy levels by controlling the frequency of the reflected x-rays. When used as an analyzer the optic 30 can select for analysis x-ray frequencies of interest that are transmitted by a sample or other means. In other multiple corner embodiments of the present invention, the number of x-ray frequencies reflected can be increased to create flexible beam conditioning or analysis applications.

As seen in FIG. 5a, when employing the new four corner optic 30 an x-ray aperture assembly 50 may be placed at the entrance zone 32, exit zone(not shown) or both. The aperture assembly can eliminate certain frequency bands of unwanted x-ray beams that will not converge to the focal point of the optic 30 and the optic 30 has a filter medium 54 that will filter coaxial x-ray beams. The filter medium 54 is configured to filter coaxial x-ray beams that travel directly through the four corner optic 30 from the entrance zone 32 to the exit zone. The filter medium may be a bandpass, highpass, or lowpass filter but is not limited to such.

X-ray aperture assembly 50 has entrance apertures 53 which are configured to allow the passage of x-rays that will or have been reflected in two dimensions. X-ray aperture assembly 50 may also be equipped with entrance apertures 52 to allow the passage of selected single bounce x-rays from segments 38, as shown in FIG. 5b.

It is to be understood that the invention is not limited to the exact construction illustrated and described above, but that various changes and modifications may be made without departing from the spirit and scope of the invention as defined in the following claims.

We claim:

1. An x-ray directing system comprising:
   a plurality of Kirkpatrick-Baez side-by-side optics which redirect x-rays; and
   a housing which encloses said Kirkpatrick-Baez side-by-side optics, wherein said housing is of a cylindrical configuration having multiple corners and an entrance zone and exit zone.

2. The x-ray directing system of claim 1, wherein said plurality of Kirkpatrick-Baez side-by-side optics have multi-layer Bragg surfaces.

3. The x-ray directing system of claim 2, wherein said multi-layer Bragg surfaces have graded-d spacing.

4. The x-ray directing system of claim 2, wherein said multi-layer Bragg surfaces are configured to reflect different frequencies of x-rays.

5. The x-ray directing system of claim 1, wherein said Kirkpatrick-Baez side-by-side optics have elliptical surfaces.

6. The x-ray directing system of claim 1, wherein said Kirkpatrick-Baez side-by-side optics have parabolic surfaces.

7. The x-ray directing system of claim 1 further including an x-ray aperture assembly, having a filter medium coupled to the interior of said assembly, wherein said assembly occludes a portion of said x-rays and said filter medium filters a portion of said x-rays entering said x-ray directing system.

8. An x-ray reflecting system comprising:
   a plurality of x-ray reflectors;
   wherein said x-ray reflectors are multi-layer Bragg x-ray reflectors; and
   wherein said x-ray reflectors are coupled together to form a cylindrical configuration having entrance and exit zones, and wherein said x-ray reflectors reflect an incident beam in two directions independently.

9. An x-ray optic comprising:
   four x-ray reflectors, wherein said four x-ray reflectors are multi-layer Bragg x-ray reflectors, and wherein said four x-ray reflectors are coupled together to form a cylindrical configuration having a rectangle as its base and four corners, whereby said x-ray reflectors reflect an incident beam in two directions independently.

10. An x-ray optic comprising;
    two side-by-side Kirkpatrick-Baez reflectors;
    wherein said Kirkpatrick-Baez reflectors have multi-layer Bragg surfaces,
    wherein said Kirkpatrick-Baez reflectors are coupled together to form a substantially enclosed cylindrical configuration having multiple corners and an entrance and exit aperture.

11. The x-ray optic of claim 10, wherein said multi-layer Bragg surfaces have graded-d spacing.

12. The x-ray optic of claim 10, wherein said multi-layer Bragg surfaces are configured to reflect different frequencies of x-rays.

13. The x-ray directing system of claim 10, wherein said side-by side Kirkpatrick-Baez reflectors have elliptical surfaces.

14. The x-ray directing system of claim 10, wherein said side-by-side Kirkpatrick-Baez reflectors have parabolic surfaces.

15. The x-ray directing system of claim 10 further including an x-ray aperture assembly, having a filter medium coupled to the interior of said assembly, wherein said aperture assembly occludes a portion of said x-rays and said filter medium filters a portion of said x-rays entering said x-ray directing system.

16. An x-ray directing system comprising:
    a multiple corner Kirkpatrick-Baez side-by-side optic which redirects x-rays, wherein said Kirkpatrick-Baez side-by-side optic has multi-layer Bragg x-ray reflective surfaces, and wherein said multiple corner Kirkpatrick-Baez side-by-side optic is radiationally coupled to a microfocused x-ray source.

* * * * *